United States Patent [19]

Sticher, Jr. et al.

[11] Patent Number: 4,547,657
[45] Date of Patent: Oct. 15, 1985

[54] POWER CONTROL UNIT

[75] Inventors: Charles K. Sticher, Jr., Snellville; Michael D. Hartley, Roswell, both of Ga.

[73] Assignee: Nordson Corporation, Amherst, Ohio

[21] Appl. No.: 579,433

[22] Filed: Feb. 13, 1984

[51] Int. Cl.⁴ .............................................. H05B 1/02
[52] U.S. Cl. .................................. 219/492; 219/493; 219/507; 219/334; 307/510
[58] Field of Search .............. 219/492, 493, 497, 334, 219/501, 506, 507, 508; 307/510, 517; 236/46 F, 46 R

[56] References Cited

U.S. PATENT DOCUMENTS

| 3,397,323 | 8/1968 | Hirsch | 219/493 |
| 4,317,987 | 3/1982 | Fieldman | 219/493 |
| 4,378,486 | 3/1983 | Yunik et al. | 219/493 |
| 4,413,172 | 11/1983 | Jones | 219/411 |

Primary Examiner—M. H. Paschall
Attorney, Agent, or Firm—Wood, Herron & Evans

[57] ABSTRACT

A power controller for placement between a source of electricity and a user of electricity such as heaters for heating thermoplastic material. The controller comprises a normally closed switch allowing electrical communication between the source and user. An electrical control circuit including a coil which is connected to the normally closed switch.

The control circuit further includes a switch assembly operable between an on and off condition. The switch assembly prevents or allows the energization of the coil when in the on or off condition, respectively. A first timing assembly causes the switch assembly to be in the on condition for a first selected duration after energization of the control circuit. A second timing assembly causes the switch assembly to be intermittently placed in an on condition after energization of the control circuit.

10 Claims, 5 Drawing Figures

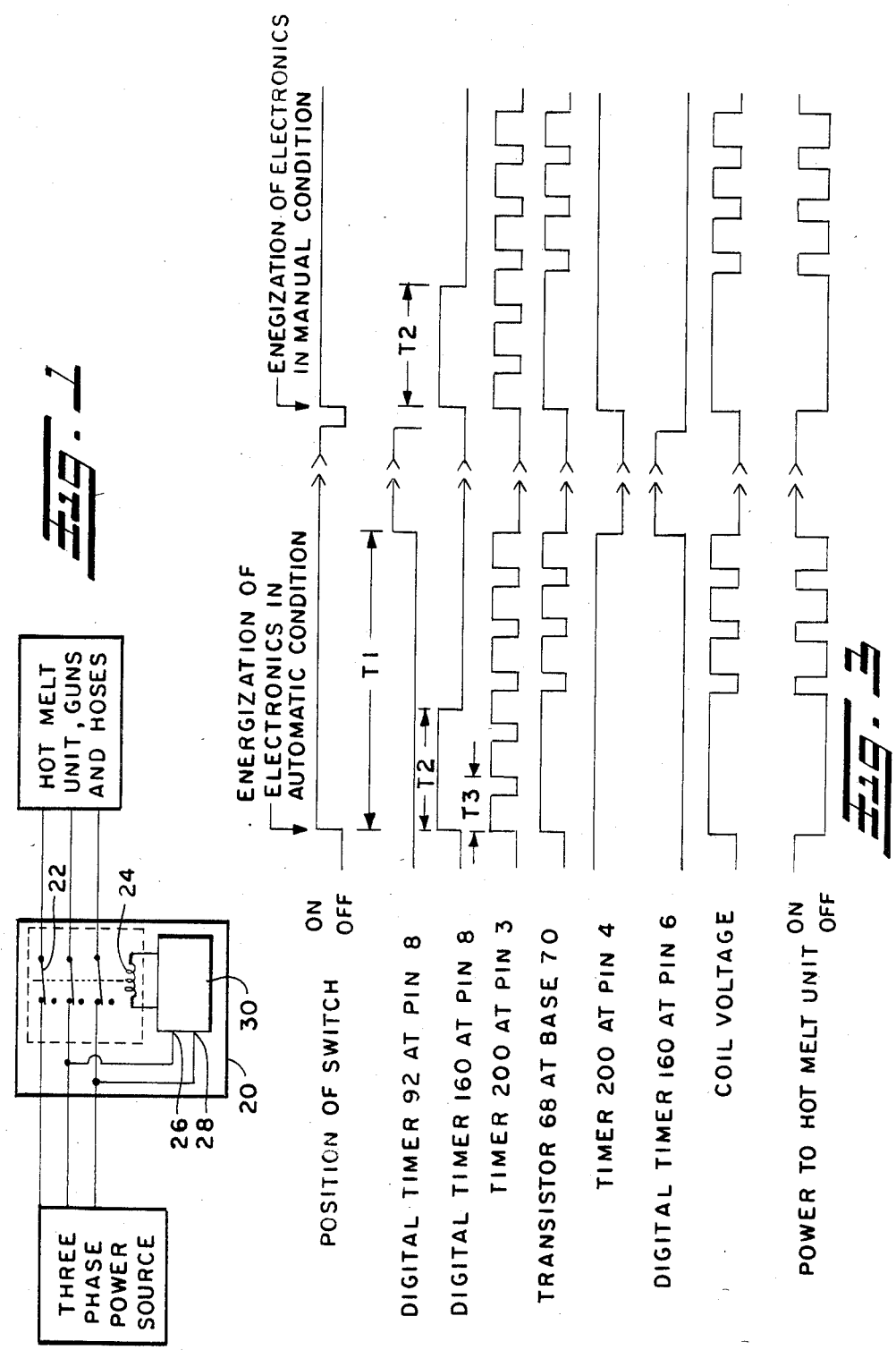

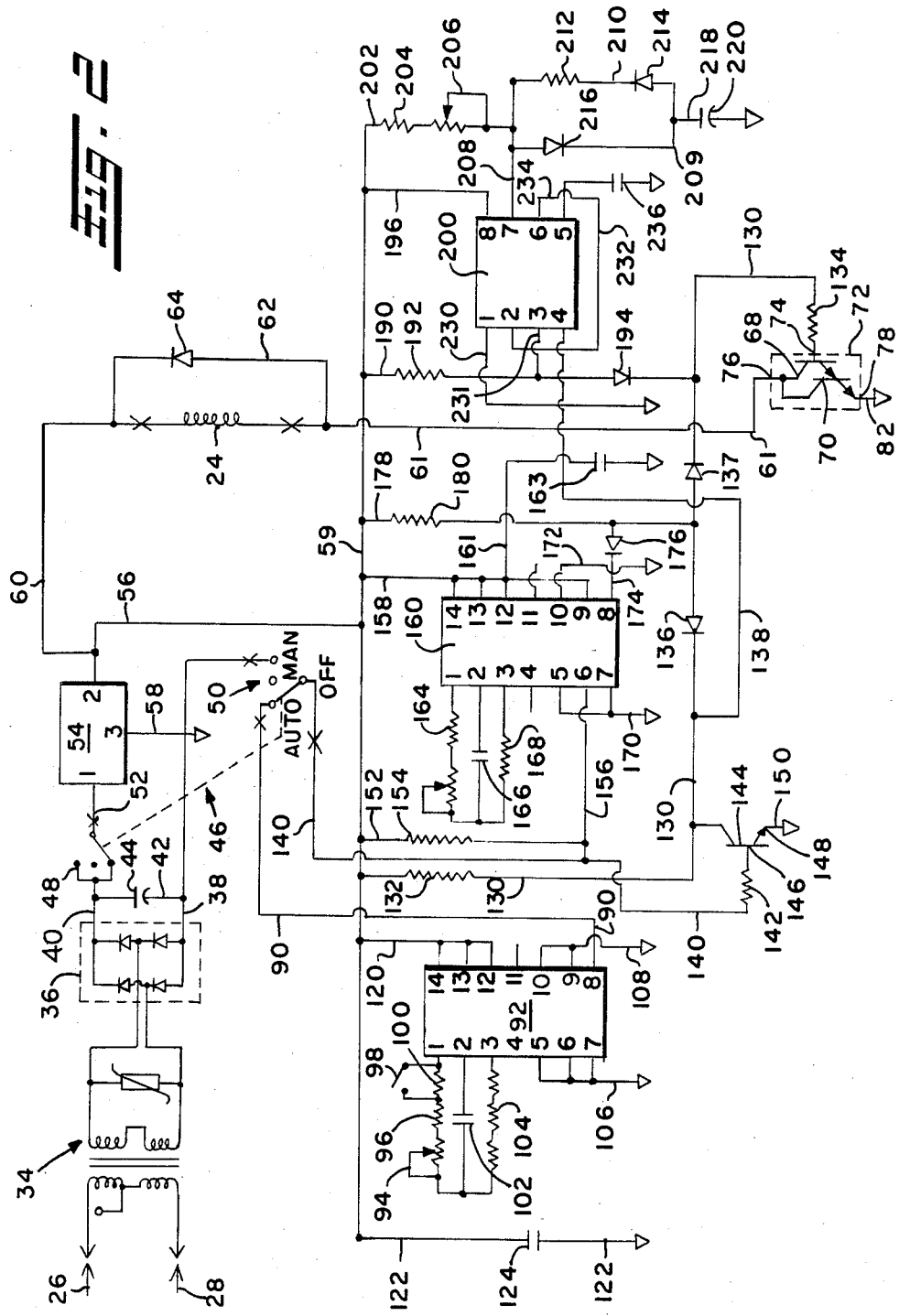

POWER CONTROL UNIT

BACKGROUND OF THE INVENTION

The invention relates to power control circuits, and in particular, to a power control circuit that will reduce power to a user device for a preselected time.

A hot melt adhesive system is mentioned throughout this application. However, it should be understood that applicants do not intend to limit the scope of available protection by this example.

Typically, a hot melt adhesive system comprises an electrically heated tank, one or more electrically heated hoses, and electrically heated guns corresponding to the hoses. Solid hot melt adhesive is placed in the tank and melted. The molten hot melt adhesive, at operating temperature, is pumped through the hose(s) and into the gun(s). Molten hot melt adhesive is then dispensed by the gun(s).

Generally speaking, when hot melt adhesives are held in the system at operating temperatures for extended periods of non-use, the hot melt adhesive may degrade. Degradation of molten hot melt adhesive may be retarded if the adhesive is kept at a temperature lower than the operating temperature but higher than the melting point. Thus, it would be advantageous to provide a power control unit that will allow for the reduction of the temperature of the molten adhesive during periods of non-use.

In manufacturing situations, oftentimes the operator knows approximately how long the period of non-use will be. For example, if over the lunch hour the gun is not used, the operator knows that the period of non-use will be about one hour. In order to minimize the time that the operator must wait on the system to reach operating temperature after the operator returns from lunch, it would be advantageous to provide a power control unit that would reduce the temperature of the molten adhesive over most of a period of non-use and yet allow the system to be at the operating temperature when the period of non-use is over.

At other times the period of non-use may not be known. Consequently, it would be advantageous to provide a power control unit that can reduce the molten adhesive to a sub-operating temperature for an indefinite period of time.

It can be expected that a user of a hot melt adhesive system may sometimes wish to use a power control unit and other times not use the unit. The unit can be placed in an "off" condition in which the power supplied to the system is unimpeded. Further, the unit is a self-contained module that is positioned between the power source (e.g. electrical outlet) and the system. The unit plugs into the outlet and the system plugs into the power unit. It is thus a very easy job to remove the power unit from the hot melt system.

SUMMARY OF THE INVENTION

The invention is a power controller for placement between a source of electricity and a user of electricity. The controller includes a normally closed switch which when closed allows electrical communication between the source and the tank, hose, and gun heaters. An electrical control circuit includes an energizable coil for moving the switch to an open condition when energized. The circuit further includes a switch means that allows for the energization of the coil when on and prevents coil energization when off.

A first timing means, which is connected to the switch means, causes the switch means to be in the on condition for a first selected duration after the control circuit is energized. A second timing means, which is connected to the switch means, causes the switch means to be intermittently placed in the on condition.

BRIEF DESCRIPTION OF THE DRAWINGS

Further objects and features of the invention will be apparent from the following description of an embodiment of the invention in connection with the accompanying drawings. It should be understood that this description is in no way limiting and that various changes may be brought to the disclosed embodiment without departing from the scope of the invention.

FIG. 1 is a schematic diagram of the standby power control unit illustrating its relationship to the power source and hot melt system;

FIG. 2 is an electrical schematic diagram of the standby power control unit;

FIG. 3 is a wave form diagram showing the condition at selected points and times in the circuit of FIG. 2;

DETAILED DESCRIPTION OF A SPECIFIC EMBODIMENT

Figure 4:
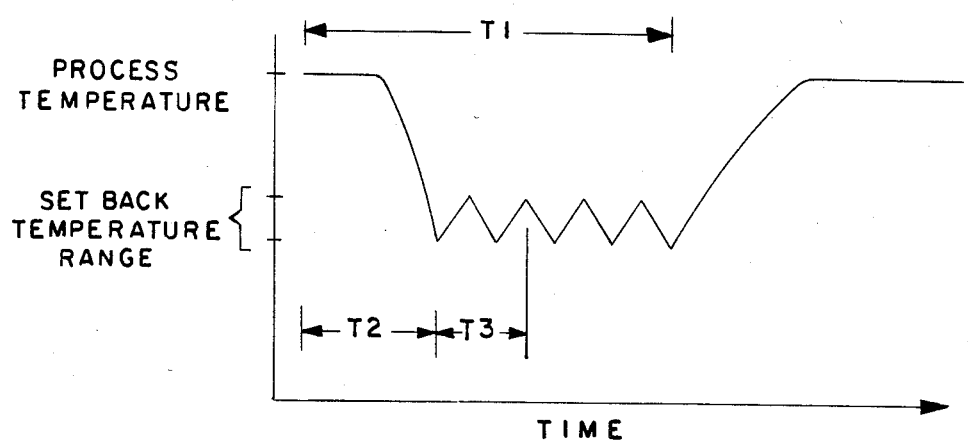
FIG. 4 is a graph illustrating time versus temperature of the molten adhesive when the standby power control unit is in the automatic condition.
Figure 5:
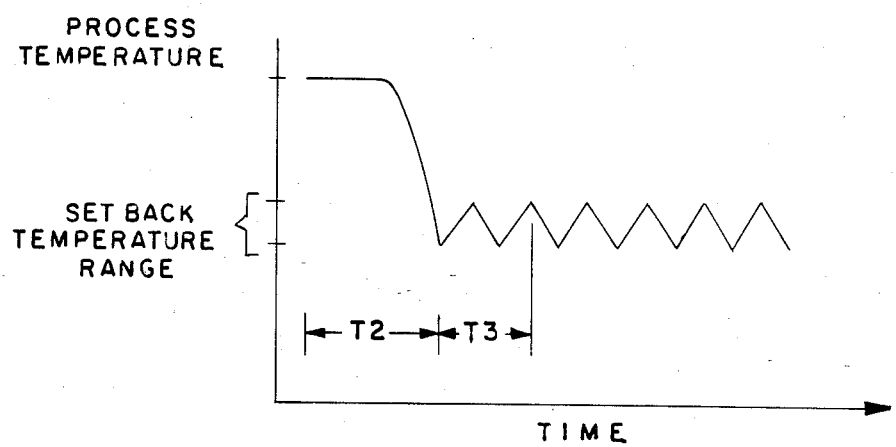
FIG. 5 is a graph illustrating time versus temperature of a molten adhesive when the standby power control unit is in the manual condition.

Referring to FIG. 1, there is illustrated a schematic view of a system which utilizes the standby power control unit generally designated as 20. Standby power control unit 20 is a separate unit that is positioned between the hot melt unit and the electrical power source. In order for the hot melt unit to be powered, power must pass through the standby power control unit to the hot melt unit. In order for power to pass through the standby power control unit, the normally closed relay 22 must be closed. Relay 22 is closed when coil 24 is not energized. However, when coil 24 is energized, relay 22 moves into the open condition. Power to the hot melt unit is now removed. The electrically powered heaters in the tank hose(s) and gun(s) are now off. This "no power" condition will last as long as coil 24 is energized. Standby power control unit 20 further includes a pair of inputs 26 and 28 which provide power to the standby power control unit electronics designated as 30.

Referring now to FIG. 2, there is illustrated the specific circuitry that comprises standby power control unit electronics 30. Power from the power source is received by the unit electronics 30 via inputs 26 and 28. Inputs 26 and 28 feed directly into power transformer 34. Power transformer 34 is directly connected to full wave rectifier 36. Power transformer 34 and full wave rectifier 36 together transform the incoming AC power supply into DC power supply.

A pair of wires 38 and 40 exit rectifier 36. Wire 38 is connected to the manual (designated "MAN") post of switch 50. Wire 40 is connected to the OFF post of switch 48. Switches 48 and 50 are operatively connected as generally indicated at 46. A wire 42, connecting wires 38 and 40, has a capacitor 44, which filters the full wave rectified signal, connected thereto. The specifications for capacitor 44 are 1500 microfarads and 25 volts.

Wire 52 connects switch 48 with voltage regulator 54 at pin 1 thereof. Voltage regulator 54 is an integrated circuit given the designation 7815ACT and is manufactured by several semiconductor manufacturers. Voltage regulator 54 takes the incoming filtered DC power and regulates the voltage so that it remains at a constant 15 volts. Wire 60 runs between wire 52 and one side of coil 24. Coil 24 is manufactured under the designation Potter & Brumfield PM17DY12.

Two transistors 68 and 70 are connected to form a Darlington device 72. Darlington device has a base 74, a collector 76, and an emitter 78. The Darlington device is manufactured under the designation MPSA13. Wire 61 connects the other side coil of 24 with Darlington device 72 at the collector 76 thereof. Wire 62 is connected to wires 60 and 61 so as to place diode 64 in a parallel connection with respect to coil 24.

Voltage regulator 54 is grounded at pin 3 through wire 58. Wire 56 connects voltage regulator 54 at pin 2 to wire 59. Wire 90 connects the automatic post (designated "AUTO") of switch 50 and pin 8 of digital timer 92. Digital timer 92 is an integrated circuit manufactured under the designation 4541. Digital timer 92 is set up to function as a one-shot timer that emits a signal, either a high or low signal, for a preselected time duration.

Digital timer 92 includes fourteen pin positions. At pin positions 1, 2 and 3 digital timer 92 is connected to potentiometer 94, resistor 96, switch 98, resistor 100, capacitor 102, and resistor 104. By adjusting potentiometer 94 the timing function of digital timer 92 can be adjusted. Pins 4 and 11 of digital timer 92 are not connected to anything. Pins 5–7 of digital timer 92 are grounded through wire 106. Pins 9 and 10 of digital timer 92 are grounded through wire 108. Pins 12–14 of digital timer 92 are connected to wire 59 by wire 120. Pin 8 of digital timer 92 and the automatic post (designated "AUTO") of switch 50 are connected by wire 90. As will be explained below, the output of digital timer 92 is at pin 8. The specific values of the above-mentioned electrical components are set forth below:

| Potentiometer | 94 | 10 K ohms |
|---|---|---|
| Resistor | 96 | 30 K ohms |
| Resistor | 100 | 47 K ohms |
| Capacitor | 102 | 1 microfarad |
| Resistor | 104 | 1 M ohms |

Wire 122 is connected to wire 59. A capacitor 124 is connected to and is grounded by wire 122. Capacitor 124 has a value of 0.1 microfarad.

Wire 130 connects wire 59 with the base 74 of Darlington device 72. Resistor 132 (having a value of 5.6K ohms), diode 136 (manufactured under the designation 1N4148), diode 137 (manufactured under the designation 1N4148), and resistor 134 (having a value of 100K ohms) are connected along wire 130.

Wire 140 connects the OFF post of switch 50 with the base 146 of transistor 144 (manufactured under the designation 2N4401). The collector of transistor 144 is connected to wire 130. The emitter 148 of transistor 144 is grounded through wire 150. A resistor 142 (of a value 10K ohms) is connected to wire 140 adjacent transistor 144.

Digital timer 160 is manufactured under the designation 4541. Digital timer 160 is set up to be a one-shot device that emits a signal, either a high or a low signal, for a predetermined duration. Digital timer 160 has fourteen pins. Through pins 1, 2 and 3 digital timer 160 is connected to potentiometer 162 (resistance=10K ohms), resistor 164 (12K ohms), capacitor 166 (1 microfarad), and resistor 168 (1M ohms). Pins 4 and 11 are not connected to anything. Pins 5 and 7 are grounded through wire 170. Pin 6 of digital timer 160, which is the master reset of digital timer 160, is connected to pin 8 of digital timer 92 by wires 156, 140 and 90.

Pins 9, 12, 13 and 14 are grounded through capacitor 163 (value of 0.1 microfarad) by wire 161. Pin 10 is grounded by wire 172. Pin 8, which is the output of digital timer 160, is connected through diode 176 (manufactured under the designation 1N4148) by wire 174 to wire 178.

Wire 152 connects wires 59 and 156. A resistor 154 (having a value of 5.6K ohms) is connected to wire 152. Wire 178 connects wires 59 and 130. A resistor 180 (having a value of 5.6K ohms) is connected to wire 178.

Timer 200 is an integrated circuit manufactured under the designation 555. Timer 200 is set up to operate as an oscillator with a variable duty cycle so as to generate pulses of a selected duration at a selected interval. Timer 200 has eight pins. Pin 1 is grounded by wire 230. Pin 2 is connected by wire 232 to pin 6. Pin 5 is grounded through a capacitor 236 (0.1 microfarad) by wire 234. Pin 8 is connected to wire 59 by wire 196. Pin 4, which is the master reset of timer 200, is connected to wire 130 by wire 138.

Wire 190 connects wire 59 and wire 130. A resistor 192 (having a value of 1K ohms) and a diode 194 (manufactured under the designation 1N4148), are connected in series along wire 190. Pin 3, which is the output of timer 200, is connected to wire 190 by wire 231.

Wire 208 extends from Pin 7 of timer 200. Wire 202 connects wire 59 with wire 208. A resistor 204 (1.5M ohms) and a potentiometer 206 (resistance equal to 2M ohms) are connected in series along wire 202. Wires 209 and 218 connect capacitor 220 (100 microfarads) to wire 208. Diode 216 (manufactured under the designation 1N4148) is connected to wire 209. Wires 210 and 218 connect capacitor 220 to wire 208. Resistor 212 1M ohms) and a diode 214 (manufactured under the designation 1N4148) are connected in series along wire 210. Capacitor 220 is grounded by wire 218.

Standby power control unit 20 may be placed in one of three conditions, each of which will be briefly described below. In the "OFF" condition, the electronics of the standby power control unit are not energized and power from the electrical power source flows freely to the hot melt unit. In the "MANUAL" condition, the electronics of the standby power control unit are energized and function to (1) cut power to the hot melt unit for a preselected period of time, and (2) then duty cycle power to the hot melt unit. Power to the hot melt unit will continue to be duty cycled until the "MANUAL" condition of the standby power control unit is changed. In the "AUTOMATIC" condition, the electronics of the standby power control unit are energized so as to function to (1) cut power to the hot melt unit for a preselected period of time, (2) then duty cycle power to the hot melt unit for another preselected period of time, and (3) then provide the hot melt unit with full power.

As described earlier, the condition of coil 24, either in an energized condition or a deenergized condition, controls the position of relay 22, and hence, whether power is supplied to the hot melt unit. When coil 24 is energized, switch 22 opens and power to the hot melt unit is removed. Coil 24 is energized along wires 60 and 61 and through the Darlington device 72. Consequently, the input at base 74 of Darlington device 72 must be sufficient to ground coil 24 through wire 82. Coil 24 then is energized. A more detailed description of the electronics of the unit and how they allow coil 24 to be energized or not are provided below.

In the "AUTOMATIC" condition, switch 48 and 50 are positioned as illustrated in FIG. 2. Electrical power from the power source is converted into a DC power supply by signal transformer 34 and full wave rectifier 36 and capacitor 44. The stable DC power passes into voltage regulator 54 which regulates the voltage so that it remains at 15 volts. Voltage regulator 54 is designated as a 78M12C with three pins. Voltage passes through wires 56 and 59.

Digital timers 92 and 160, and timer 200 are turned on through wires 120, 158 and 196, respectively. The duration that the output of digital timers 92 and 160 remain in a particular condition is selectable by varying the values of the components connected to pins 1, 2 and 3 thereof.

In the field, the duration that digital timers 92 and 160 output can be selected by adjusting potentiometers 94 and 162, respectively. Digital timer 92 is set to output a low signal at pin 8 for a duration equal to T1. Digital timer 160 is set to output a high signal at pin 8 for a duration equal to T2. The significance of T1 and T2 will be explained in more detail below.

Timer 200 is adjusted so that it outputs a steady sequence of pulses at pin 3. The duration between commencement of the pulses is equal to T3.

As illustrated in FIG. 3, upon the energization of the electronics of the standby power control unit the output of digital timer 92 is low for a time T1. The output at pin 8 of digital timer 160 is high for a time T2. The output at pin 3 of timer 200 is pulsed with a duration between commencement of pulses equal to T3. The input at pin 4 of timer 200 is high at the energization of the electronics.

Diodes 136 and 176 together function as an AND gate having an output to diode 137. In other words, the output of digital timer 160 at pin 8 must be high, which is applied to diode 176, and transistor 144 must be off so that sufficient voltage is applied to diode 136.

Diodes 137 and 194 function as an OR gate having an output to base 74 of Darlington device 72. Consequently, when digital timer 160 and transistor 144 are in the conditions described above, the voltage applied to diode 137 is sufficient to allow a sufficient voltage to be applied at the base of Darlington device 72 so as to ground coil 24 thereby energizing it and cutting off the power to the hot melt unit.

In reviewing the wave forms of FIG. 3 entitled "Digital Timer 92 at Pin 8", "Digital Timer 160 at Pin 8", "Coil Voltage", "Transistor 68 at Base 70", and "Power to Hot Melt Unit", one sees that for time T2 the output at pin 8 of digital timer 160 is high, and transistor 144 is off (since the output at pin 8 of digital timer 92 is low). The result being that the coil voltage is high and power to the hot melt unit is off.

As previously mentioned, diodes 137 and 194 function as an AND gate. When the output of timer 200 at pin 3 is high, a sufficient voltage is applied to diode 194 to supply a sufficient voltage to the base 74 of Darlington device 72. The same sequence of events regarding the energization of coil 24 occurs as described above. The end result being that coil 24 is energized through the Darlington device, and power is cut off to the hot melt unit.

In reviewing the wave forms of FIG. 3 entitled "Digital Timer 92 at Pin 8", "Timer 200 at Pin 3", "Transistor 68 at Base 70", "Coil Voltage", and "Power to Hot Melt Unit", one sees that for the times transistor 144 is off and the output of timer 200 at pin 3 is high, transistor 76 is on, coil 24 is energized, and power to the hot melt unit is off.

The power to the hot melt unit is cut off for a period of time T2. The power is then applied to the hot melt unit in pulses for another predetermined time so as to maintain the unit within a standby temperature range. The time between the start of successive pulses equals T3. The standby temperature range is low enough so as to not degrade the molten adhesive yet high enough to maintain the adhesive in a molten condition.

After a time T1, digital timer 92 emits a signal at pin 8. The signal travels by wires 90 and 140 through resistor 142 and is applied to base 146 of transistor 144 thereby turning on transistor 144. When transistor 144 is turned on, pin 4 of timer 200 is brought to ground through transistor 144 and wire 150 causing the output of timer 200 at pin 3 to remain low. Further, the anode of diode 176 is brought to ground, and the anodes of diodes 137 and 194 go low. The high signal output is received by digital timer 160 at pin 6 which disables digital timer 160.

Upon the cessation of pulses from timer 200 at pin 3, the voltage applied at the base of transistor 68 is insufficient to ground and thereby energize coil 24 through transistor 68.

It can therefore be seen that upon digital timer 92 timing out so as to output a high signal digital timer 160 and timer 200 are disabled. The consequence being that coil 24 is deenergized which allows power to be passed on to the hot melt unit. Even though the electronics remain energized, all the timers have timed out and power will continue to pass to the hot melt unit as long as the standby power control unit remains in the automatic condition.

In the "MANUAL" condition, switches 48 and 50 are positioned so that switch 48 contacts the upper post and switch 50 contacts the post designated "MAN". The same considerations apply with respect to the energization of coil 24 whether the standby power control unit is in the manual or automatic condition. Thus, they will not be described again.

Digital timers 92 and 160 and timer 200 are energized in the same fashion as earlier described. Digital timer 160 and timer 200 operate the same as described earlier with regard to the initial energization of the electronics of the standby power control unit. Specifically, digital timer 160 causes coil 24 to be energized for a time T2, and timer 200 causes coil 24 to be pulsatingly energized. The duration between each successive pulse equaling T3.

However, transistor 144 is not connected to digital timer 92 in the manual condition. Consequently, transistor 144 will not be turned on so that timer 200 will continue to emit pulses at pin 3. After digital timer 160 has timed out, these pulses will result in a pulsing of power to the hot melt unit as long as the standby power control unit remains in the manual condition. The continuous pulsation of power to the hot melt unit results in the maintenance of the molten adhesive within a standby temperature range.

In the "off" condition, the electronics of the standby power control unit are not energized. Consequently, the coil is not energized and power will be supplied to the hot melt unit when the standby power control unit is in the "OFF" condition.

While we have described only a single preferred embodiment of our invention, persons skilled in this art will appreciate changes and modifications which may be made without departing from the spirit of our invention. Therefore, we do not intend to be limited except by the scope of the following appended claims.

What is claimed is:

1. A power controller for placement between a source of electricity and electrically-powered heaters for heating thermoplastic material, the controller comprising:
   a normally closed switch allowing electrical communication between the source and the heaters;
   an electrical control circuit including a coil, said coil connected to said switch so as to open said switch when energized, said electrical control circuit further including:
      a switch means, operable between an on and an off condition, for allowing the energization of said coil when in the on condition and preventing the energization of said coil when in the off condition;
      a first timing means, operatively connected to said switch means, for causing said switch means to be in the on condition for a first selected duration after said electrical control circuit is energized; and
      a second timing means, operatively connected to said switch means, for causing said switch means to be intermittently placed in the on condition.

2. The power controller of claim 1 further including:
   a third timing means, operatively connected to said first and second timing means, for disabling said first and second timing means after a second selected duration after said electrical control circuit is energized so as to place said switch means in an off condition.

3. The power controller of claim 2 wherein said first selected duration is less than said second selected duration.

4. The power controller of claim 2 further includes means for placing said control circuit in either an off condition wherein said control circuit is deenergized, or in a manual condition wherein said third timing means is disabled, or an automatic condition wherein said third timing means is able to operate on said first and second timing means.

5. The power controller of claim 1 wherein said first timing means includes:
   a first digital timer having an initially high output signal for said first selected duration, said first digital timer including means to select the duration of said first selected duration;
   a diode-AND gate having two inputs and one output, one of said AND inputs being constantly high and other of said AND inputs connected to receive the signal from said output of said first timer;
   a diode-OR gate having two inputs and one output, one of said OR inputs receiving the output of said diode-AND gate, said OR output connected to said switch means so as to place said switch means in an on condition during the emission of a signal from said OR output.

6. The power controller of claim 1 wherein said second timing means includes:
   a second timer emitting high pulses from the output thereof upon the energization of said electrical control circuit;
   a diode OR gate having two inputs and one output, other of said OR inputs receiving the output of said second timer, said OR output connected to said switch means so as to place said switch means in an on condition during the emission of a high signal from said OR output.

7. The power controller of claim 5 or claim 6 wherein said switch means includes:
   a Darlington device having a collector, emitter and base;
   said base connected to said OR output, said emitter being grounded, and said collector connected to said coil.

8. The power controller of claim 1 wherein said electrical control circuit further includes means for converting alternating electrical current into a constant voltage electrical current.

9. A power controller for controlling the supply of electrical power to electrically-powered heaters for heating thermoplastic material, the power controller comprising:
   a switch means, movable between a first and a second condition, for preventing the flow of electrical power to the heaters when in the first condition and allowing the flow of electrical power to the heaters when in the second condition;
   a timing means, operatively connected to said first switch means and switchable between off, manual and automatic conditions, for placing said switch means in said first or second condition;
   when in the off condition said timing means is disabled and said switch means is in the second condition, when in the manual condition said timing means continuously places said switch means in the first condition for a first selected duration and thereafter intermittently places said switch means in the first condition, when in the automatic condition said timing means continuously places said switch means in the first condition for the first selected duration then intermittently places said switch means in the first condition for a second selected duration and thereafter continuously placing said switch means in the second condition.

10. The power controller of claim 9 wherein said timing means includes:
    a first digital timer having an initially high output signal for said first selected duration, said first digital timer including means to select the duration of said first selected duration;
    a diode-AND gate having two inputs and one output, one of said inputs being constantly high and other of said inputs connected to receive the signal from said output of said first timer;
    a diode-OR gate having two inputs and one output, one of said OR inputs receiving the output of said diode-AND gate, said OR output connected to said switch means so as to place said switch means in the first condition during the emission of a signal from said OR output;

a second timer emitting high pulses from the output thereof upon the energization of said electrical control circuit;

other of said OR inputs receiving the output of said second timer, said OR output connected to said switch means so as to place said switch means in the first condition during the emission of a high signal from said OR output; and a third timer disabling said first and second timers so neither generates a high signal after a second selected duration.

* * * * *